United States Patent
Zheng et al.

(10) Patent No.: US 12,375,378 B2
(45) Date of Patent: Jul. 29, 2025

(54) PHYSICAL LAYER TRANSCEIVER WITH REDUCED VARIATION IN PACKET LATENCY

(71) Applicant: Marvell Asia Pte Ltd, Singapore (SG)

(72) Inventors: Jeff Junwei Zheng, Irvine, CA (US); Ming-Tak Leung, Irvine, CA (US); Atif Ahmad, Tustin, CA (US); Lenin Patra, Dublin, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 778 days.

(21) Appl. No.: 17/655,719

(22) Filed: Mar. 21, 2022

(65) Prior Publication Data

US 2022/0303109 A1  Sep. 22, 2022

Related U.S. Application Data

(60) Provisional application No. 63/164,351, filed on Mar. 22, 2021.

(51) Int. Cl.
*H04L 43/0852* (2022.01)
*H04B 1/40* (2015.01)
*H04L 7/00* (2006.01)
*H04L 7/04* (2006.01)

(52) U.S. Cl.
CPC .......... *H04L 43/0858* (2013.01); *H04B 1/40* (2013.01); *H04L 7/0004* (2013.01); *H04L 7/0079* (2013.01); *H04L 7/04* (2013.01)

(58) Field of Classification Search
CPC ... G06F 1/12; H04J 3/06; H04J 3/0635; H04J 3/0638; H04J 3/0661; H04J 3/0697; H04L 7/0004; H04L 7/0008; H04L 7/0016; H04L 7/0033; H04L 7/005; H04L 7/04; H04L 7/10; H04L 7/0079; H04L 7/0091; H04L 43/0852; H04L 43/0858; H04B 1/38; H04B 1/40

See application file for complete search history.

(56) References Cited

U.S. PATENT DOCUMENTS

| | | | |
|---|---|---|---|
| 7,263,149 B2 * | 8/2007 | Ware | G06F 1/12 |
| | | | 327/144 |
| 10,033,523 B1 * | 7/2018 | Remla | H04J 3/0685 |
| 2020/0097038 A1 * | 3/2020 | Kinnerk | G06F 1/14 |

* cited by examiner

*Primary Examiner* — Betsy Deppe (57) ABSTRACT

A method of reducing impact of variation in latency in data transport between clock domains of a physical layer transceiver having physical coding sublayer circuitry with a first clock in a first clock domain and physical medium attachment circuitry with a second clock in a second clock domain, includes determining, during an initial training of a link, a transmit latency value in a transmit direction from the first clock domain to the second clock domain, determining, during the initial training of the link, separately from determining the transmit latency value, a receive latency value in a receive direction from the second clock domain to the first clock domain, and using the transmit latency value and the receive latency value to account for latency in transfer of data between the first clock domain and the second clock domain following the initial training until a subsequent training.

26 Claims, 5 Drawing Sheets

FIG. 6

PHYSICAL LAYER TRANSCEIVER WITH REDUCED VARIATION IN PACKET LATENCY

CROSS REFERENCE TO RELATED APPLICATIONS

This disclosure claims the benefit of commonly-assigned U.S. Provisional Patent Application No. 63/164,351, filed Mar. 22, 2021, which is hereby incorporated by reference herein in its entirety.

FIELD OF USE

This disclosure relates to an Ethernet physical layer transceiver in which variation in packet latency is reduced. More particularly, this disclosure relates to an Ethernet physical layer transceiver in which the packet latency can be calibrated to a known value, thereby reducing latency variation, and enhancing the ability to account for latency.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

An Ethernet physical layer transceiver (PHY) includes a physical coding sublayer (PCS) which connects to a local "host" device, and physical medium attachment (PMA) layer which connects to an Ethernet channel. Those two portions of the PHY constitute two separate clock domains operating at different clock rates. For example, for 10-gigabit Ethernet (10GBASE-T), the PCS clock operates at 312.5 MHz, while the PMA clock operates at 800 MHz. Because those two clock rates are not multiples of each other, even though the two clocks may be derived from a common clock source, the edges of the two clocks coincide only very occasionally. Moreover, the interval between edges of the two different clocks continually varies between those occasions. In one implementation, the PCS and PMA logic can operate with parallel datapaths running at a divided down clock rate of the 312.5 MHz and 800 MHz clocks, respectively. For example, the PCS can be designed to operate with two parallel datapaths, each with a clock rate of 156.25 MHz.

Training of an Ethernet link between two PHYs includes establishing the latency experienced by a packet traversing the link, reflected in the difference between the timestamp placed on the packet when it is received by the receiving link partner PHY and the timestamp placed on the packet when it is transmitted by the originating link partner PHY. The latency, if known, can be accounted for by adjusting the timestamps. However, because the packet originates in the 312.5 MHz PCS time domain of one PHY, and ultimately lands in the 312.5 MHz PCS time domain of another PHY, the latency may vary because of variations in the latency across the time domain boundary, for the reasons discussed above. Because of such latency variations, it may be difficult to determine the required timestamp adjustment. Moreover, even if the latency variation can be determined, the latency variation may change if either or both of the PHYs are reset. Therefore, it is difficult to account for packet latency across a time domain boundary because latency variations make it difficult to know what the required latency correction is.

SUMMARY

In accordance with implementations of the subject matter of this disclosure, a method of reducing impact of variation in latency in data transport between clock domains of physical layer transceiver having physical coding sublayer circuitry with a first clock in a first clock domain and physical medium attachment circuitry with a second clock in a second clock domain, includes determining, during an initial training of a link, a transmit latency value in a transmit direction from the first clock domain to the second clock domain, determining, during the initial training of the link, separately from determining the transmit latency value, a receive latency value in a receive direction from the second clock domain to the first clock domain, and using the transmit latency value and the receive latency value to account for latency in transfer of data between the first clock domain and the second clock domain following the initial training until a subsequent training.

In a first implementation of such a method, determining the transmit latency value in the transmit direction may include resetting the first clock and the second clock simultaneously and starting transfer of data from the first clock domain to the second clock domain at a predetermined cycle of one of the first clock and the second clock.

According to a first aspect of that first implementation, starting the transfer of data from the first clock domain to the second clock domain at the predetermined cycle of one of the first clock and the second clock may include starting the transfer of data from the first clock domain to the second clock domain at the predetermined cycle of the second clock.

In a second implementation of such a method, determining the receive latency value in the receive direction may include resetting the first clock simultaneously with detection of a received data frame.

According to a first aspect of that second implementation, the detection of the received data frame may include recovery of a start-of-frame signal.

In a third implementation of such a method, determining the receive latency value in the receive direction may include detecting a start of a received data frame, identifying a number of unit intervals of the first clock that have elapsed, from a most recent simultaneous reset of the first clock and the second clock, to the start of the received data frame, and retrieving, as the receive latency value, a stored latency value corresponding to the number of unit intervals.

According to a first aspect of that third implementation, the retrieving may include retrieving the receive latency value from a look-up table, using the number as an index.

A first instance of that first aspect may further include, prior to the detecting, establishing the look-up table in a calibration operation.

In a first variant of that first instance, the calibration operation may include separately measuring the receive latency when a data frame is received in each of a plurality of unit intervals of the first clock.

In a second variant of that first instance, the calibration operation may include simulating reception of a data frame in each of a plurality of unit intervals of the first clock, and simulating measurement of the receive latency for each of the plurality of unit intervals.

In a fourth implementation of such a method, determining the transmit latency value in the transmit direction may include establishing a synchronization pulse where the first clock and the second clock align, and aligning a transmit frame boundary with the synchronization pulse to fix the transmit latency value.

In a fifth implementation of such a method, determining the receive latency value in the receive direction may include establishing a synchronization pulse where the first clock and the second clock align, and counting, as the transmit latency value, a number of time intervals from the synchronization pulse to a received frame boundary.

In a sixth implementation of such a method, using the transmit latency value and the receive latency value to account for latency in transfer of data between the first clock domain and the second clock domain may include adjusting timestamps of data packets transferred between the first clock domain and the second clock domain.

In accordance with implementations of the subject matter of this disclosure, a physical layer transceiver includes physical coding sublayer circuitry and physical medium attachment circuitry, the physical coding sublayer circuitry being configured for transport of data between a host device and the physical medium attachment circuitry, and the physical medium attachment circuitry being configured for transport of data between the physical coding sublayer circuitry and a channel medium, and clock and control circuitry configured to provide a clock standard to the physical coding sublayer circuitry and the physical medium attachment circuitry, the clock standard being converted to a first clock for a first clock domain of the physical coding sublayer circuitry and a second clock for a second clock domain of the physical medium attachment circuitry, the clock and control circuitry further being configured to reduce impact of variation in latency in data transport between the first clock domain and the second clock domain by determining, during an initial training of a link, a transmit latency value in a transmit direction from the first clock domain to the second clock domain, determining, during the initial training of the link, a receive latency value in a receive direction from the second clock domain to the first clock domain, and using the transmit latency value and the receive latency value to account for latency in transfer of data between the first clock domain and the second clock domain following the initial training until a subsequent training.

In a first implementation of such a physical layer transceiver, the clock and control circuitry may be configured to determine the transmit latency value in the transmit direction by resetting the first clock and the second clock simultaneously, and to start transfer of data from the first clock domain to the second clock domain at a predetermined cycle of one of the first clock and the second clock.

According to a first aspect of that first implementation, the clock and control circuitry may be configured to start the transfer of data from the first clock domain to the second clock domain at the predetermined cycle of one of the first clock and the second clock by starting the transfer of data from the first clock domain to the second clock domain at the predetermined cycle of the second clock.

In a second implementation of such a physical layer transceiver, the clock and control circuitry may be configured to determine the receive latency value in the receive direction by resetting the first clock simultaneously with detection of a received data frame.

According to a first aspect of that second implementation, the clock and control circuitry may further include clock-data recovery circuitry configured to recover a start-of-frame signal upon detection of the received data frame.

In a third implementation of such a physical layer transceiver, the clock and control circuitry may be configured to determine the receive latency value in the receive direction by detecting a start of a received data frame, identifying a number of unit intervals of the first clock that have elapsed, from a most recent simultaneous reset of the first clock and the second clock, to the start of the received data frame, and retrieving, as the receive latency value, a stored latency value corresponding to the number of unit intervals.

According to a first aspect of that third implementation, the clock and control circuitry may be configured to retrieve the receive latency value from a look-up table, using the number as an index.

According to a second aspect of that third implementation, the clock and control circuitry may be configured to establish the look-up table in a calibration operation.

In a first instance of that second aspect, the clock and control circuitry may be configured to establish the look-up table by measuring the receive latency when a data frame is received in each of a plurality of unit intervals of the first clock, and storing, in the look-up table, the measured receive latency for each of the plurality of unit intervals.

In a second instance of that second aspect, the clock and control circuitry may be configured to establish the look-up table by simulating reception of a data frame in each of a plurality of unit intervals of the first clock, simulating measurement of the receive latency for each of the plurality of unit intervals, and storing, in the look-up table, the simulated measured receive latency for each of the plurality of unit intervals.

In a fourth implementation of such a physical layer transceiver, the clock and control circuitry may be configured to determine the transmit latency value in the transmit direction by establishing a synchronization pulse where the first clock and the second clock align, and aligning a transmit frame boundary with the synchronization pulse to fix the transmit latency value.

In a fifth implementation of such a physical layer transceiver, the clock and control circuitry may be configured to determine the receive latency value in the receive direction by establishing a synchronization pulse where the first clock and the second clock align, and counting, as the transmit latency value, a number of time intervals from the synchronization pulse to a received frame boundary.

In a sixth implementation of such a physical layer transceiver, the clock and control circuitry may be configured to account for latency in transfer of data between the first clock domain and the second clock domain, to reduce impact of variation in latency in data transport between the first clock domain and the second clock domain, by using the transmit latency value and the receive latency value to adjust timestamps of data packets transferred between the first clock domain and the second clock domain following the initial training until the subsequent training.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, training of an Ethernet link between two PHYs includes establishing the latency experienced by a packet traversing the link, reflected in the difference between the timestamp placed on the packet when it is received by the receiving link partner PHY and the timestamp placed on the packet when it is transmitted by the originating link partner PHY. However, because the packet originates in the 312.5 MHz PCS time domain of one PHY, and ultimately lands in the 312.5 MHz PCS time domain of another PHY, the latency may vary because of variations in the latency across the time domain boundary, for the reasons discussed above. Moreover, even if the latency variation, and therefore the latency, can be determined, the latency variation may change if either or both PHYs are reset. Because the packet latency varies, it is difficult to account for packet latency.

In accordance with implementations of the subject matter of this disclosure, packet latency variations may be accounted for by treating transmit latency and receive latency separately.

In the transmit direction, both the PCS 312.5 MHz clock and the PMA 800 MHz clock are under the control of the local PHY and are locked together. There are various ways to generate 312.5 MHz and 800 MHz clocks that are locked together. For example, a master clock source at a higher frequency (e.g. 3.2 GHz) can be used, and the generated clock output can be divided with a clock divider or state machine logic to provide average clock frequencies of 312.5 MHz and 800 MHz. In this case, the clock edge relationship between the 312.5 MHz clock and the 800 MHz clock repeats after a fixed number of clock periods. In particular, the two clocks would be expected to align every 256 periods of the 800 MHz clock. A synchronization pulse ("sync_pulse") can be generated once every 256 periods of the 800 MHz clock. Therefore, if the location of the transmit data frame boundary is established and aligned with this synchronization pulse, the contribution of the time domain boundary crossing to the latency of a transmitted packet will remain constant even through a power-down/power-up cycle or a hardware reset cycle, as long as the alignment of the sync_pulse and the transmit data frame boundary is re-established. However, while that contribution to latency is constant, it may not be 0, but rather may be as much as 0.3125 ns because of irregularities in the 312.5 MHz PCS clock. Nevertheless, the contribution of the local time domain boundary crossing to the latency for transmitted data can be known, reducing latency variation.

Determining the latency in the receive direction is more complicated, because the latency variation may be impacted by both the local PHY as well as the remote link partner PHY. For example, the latency variation in the receive direction may include components such as the phase difference between the 800 MHz clock of the local PHY and the 800 MHz clock of the remote link partner PHY (which in some implementations may be up to 1.25 ns), as well as the effect of the clock domain crossings in the remote link partner PHY and the local PHY, (which contribute up to 3.2 ns of latency at each PHY for a single datapath PCS with a 312.5 MHz clock). For a single datapath PCS with a 312.5 MHz clock, the total latency variation can be up to 3.2+3.2+1.25+0.3125=7.96 ns. In other implementations with a 2× datapath PCS, the total latency variation can be up to 6.4+6.4+1.25+0.3125=14.36 ns.

According to a first implementation, on the transmit side, by always releasing the reset, or restarting the hardware, at a point where the 312.5 MHz PCS clock and the 800 MHZ PMA clock have a constant fixed phase relationship (e.g., the sync_pulse location described above), and because an LDPC frame always starts on the first cycle of the 800 MHZ PMA clock after the hardware is restarted, a constant fixed latency on the time domain boundary crossing may be established. On the receive side, the 312.5 MHZ PCS clock generation logic is restarted on detection of the start of a received LDPC frame according to the first implementation. This restart of the 312.5 MHz PCS clock will ensure that the PCS clock and the PMA clock have a constant fixed phase relationship. After this alignment, the clock domain crossing latency from the start of an LDPC frame in the PMA clock domain to the start of the data in the PCS clock domain then fixed on every reset of the link connection.

According to a second implementation, on the receive side, latency values are collected via actual measurement, or via simulation, for each unit interval of the PMA clock (e.g., 256 unit intervals of an 800 MHz PMA clock for the duration of a 320 ns LDPC frame) and those latency values are stored—e.g., in a look-up table. When the start-of-frame (SOF), or "Rx blip," signal for a received frame is detected, the interval between the "Rx blip" and the next sync_pulse is identified and used as an index to retrieve the stored latency value, which is used as the latency value from that point until the next clock reset event. This latency value can be used for compensation, or can be calibrated out with a fixed timestamp adjustment.

Accordingly, because latency variation is reduced or eliminated, the need to determine latency each time a new frame arrives is reduced or eliminated, and previously determined latency values can be used for latency compensation (e.g, using timestamp adjustments).

The subject matter of this disclosure may be better understood by reference to FIGS. 1-6.

Figure 1:
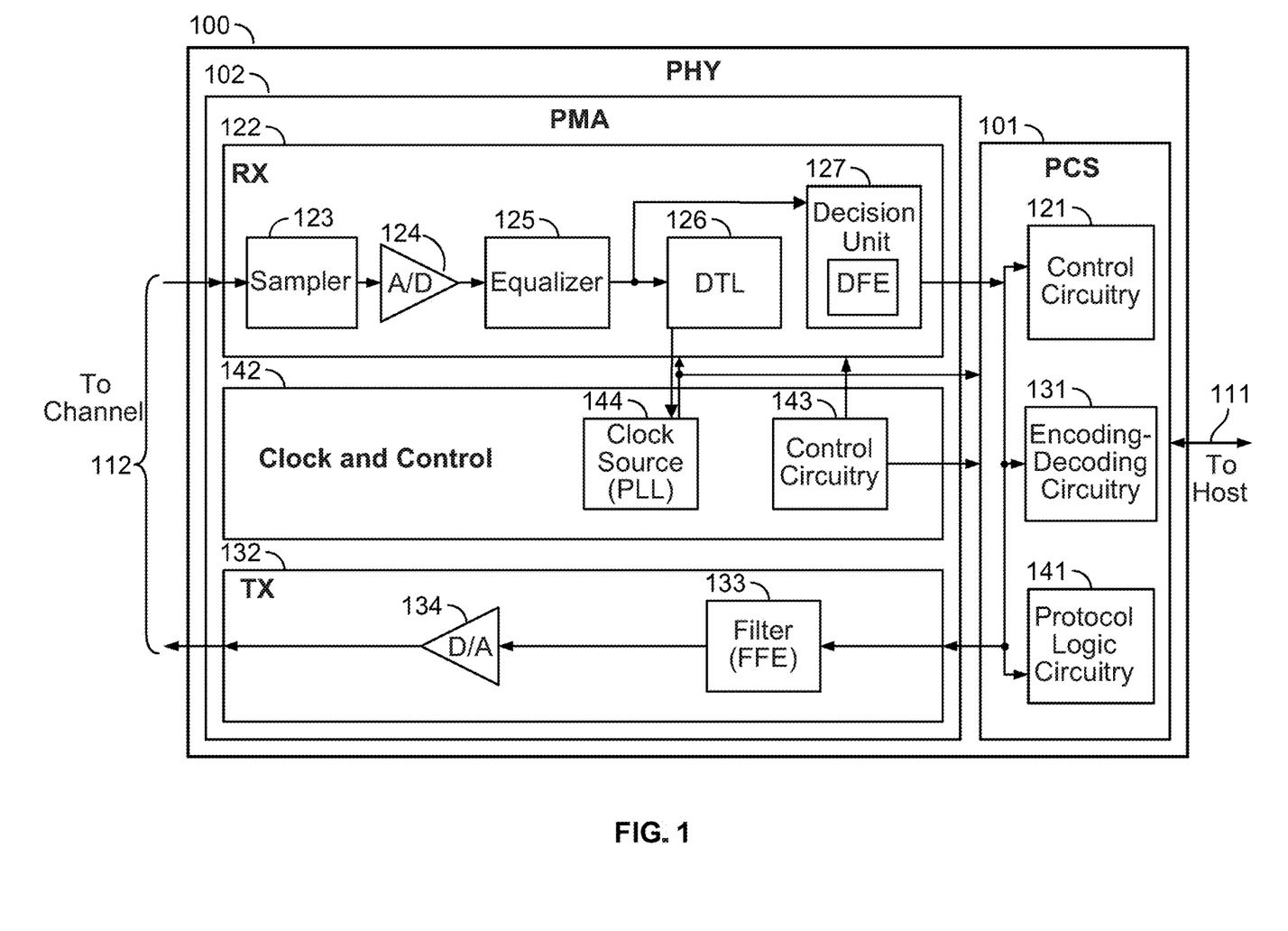
FIG. 1 is a simplified block diagram of a physical layer transceiver in accordance with implementations of the subject matter of this disclosure.

FIG. 1 is a simplified block diagram of a PHY 100 in which the subject matter of this disclosure may be implemented. PHY 100 includes a Physical Coding Sublayer (PCS) circuitry module 101 which communicates at 111 with a local "host" device (not shown), and a Physical Medium Attachment circuitry module 102 which communicates at 112 with a wireline channel medium (e.g., an Ethernet cable; not shown).

PCS circuitry module 101 includes, at least, control circuitry 121, encoding/decoding circuitry 131, and protocol logic circuitry 141, which operate on data flowing, in both directions, between the host device and PMA circuitry module 102.

PMA circuitry module 102 includes a receive path 122, a transmit path 132 and a clock/control block 142. Clock/control block 142 includes at least control circuitry 143 and clock source 144. Clock source 144, which may, for example, be a phase-locked loop (PLL), may provide a master clock for the entire PHY 100, which may be used directly, or divided down, in each of PCS circuitry module 101 and PMA circuitry module 102 (e.g., to provide the 800 MHz and 312.5 MHz clocks described above).

Transmit path 132 may be relatively straightforward, with a filter, such as a feed-forward equalizer (FFE) 133 and a digital-to-analog converter 134 to drive the transmitted signal onto the channel medium.

Receive path 122 includes, at least, a sampler 123, an analog-to-digital converter 124, and an equalizer 125 whose output feeds, in parallel, a digital timing loop (DTL) unit 126 and a data decision unit 127 that may include filters such as, by way of example in this particular implementation, a decision-feedback equalizer (DFE). Receive path 122 is clocked by an 800 MHz clock from a phase-locked loop (PLL) 144. DTL unit 126 provides timing information back to PLL 144 for clock-data recovery, and allows the sampling to stay locked.

Figure 2:
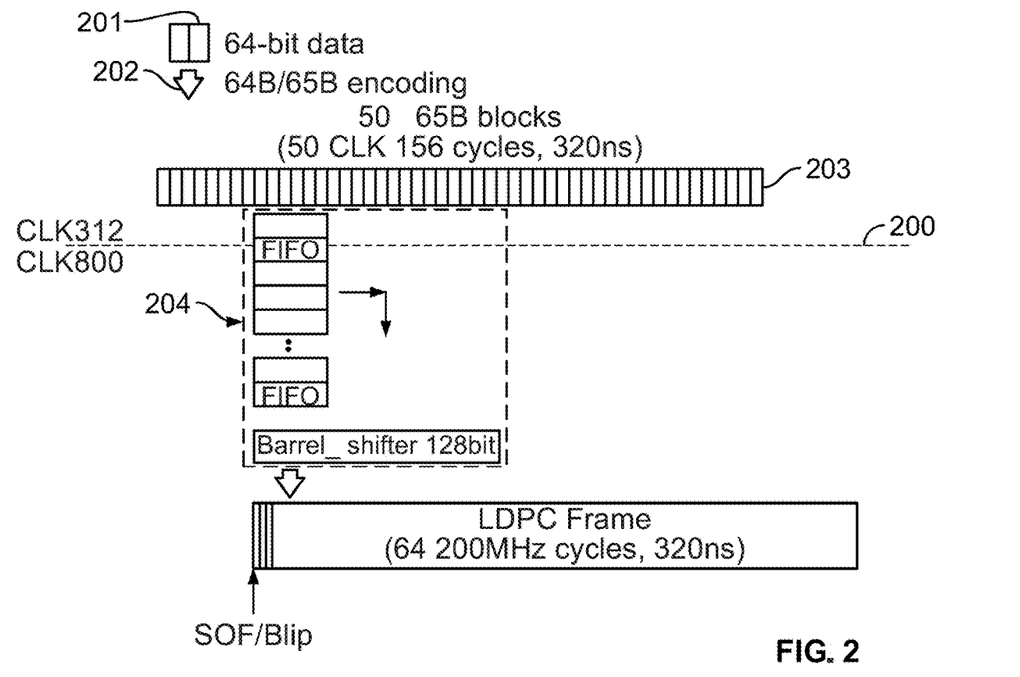
FIG. 2 illustrates how latency variation may be introduced during egress, or transmission, of a data frame across a clock domain boundary.

FIG. 2 shows how latency variation may be introduced during egress, or transmission, of data of a low-density parity check code (LDPC) frame across clock domain boundary 200 in transmit path 132. In the drawings, the 312.5 MHz clock domain is identified as "CLK312", while the 800 MHz clock domain is identified as "CLK800". 64-bit data 201 is encoded (e.g., using 64 B/65 B encoding 202 as described in the IEEE 802.3 standard) into 65-bit blocks. These continuous streams of 65-bit blocks are "framed" into 50 65-bit blocks 203 occupying 50 unit intervals of a 156.25 MHz clock (the 312.5 MHz clock divided by 2), extending over a total duration of 320 ns. The data is clocked out across boundary 200 via framer/encoder block 204, which includes a FIFO buffer and barrel shifter (both shown) as well as an auxiliary bit and parity bit insertion logic (neither shown). Framer/encoder 204 reconstructs, from the 50 65 B blocks, an LDPC frame occupying 64 unit intervals of a 200 MHz clock (the 800 MHz clock divided by 4) extending over a total duration of 320 ns. As the data crosses boundary 200 via the FIFO buffer of framer/encoder 204, it is clocked into the FIFO buffer according to the 312.5 MHz clock, but clocked out of the FIFO buffer according to the 800 MHz clock, whose edges have a varying relationship with the edges of the 312.5 MHz clock as noted above. The clock edge relationship is determined in framer/encoder 204, which also defines the start-of-frame (SOF) of the 50 65 B blocks. As a result, unless corrected in accordance with implementations of the subject matter of this disclosure, different blocks of data would leave the FIFO of framer/encoder 204 after different durations spent within the FIFO of framer/encoder 204, depending on the relative positions of the edges of the two clocks, causing latency variations and giving rise to disruptions in the data.

Figure 3:
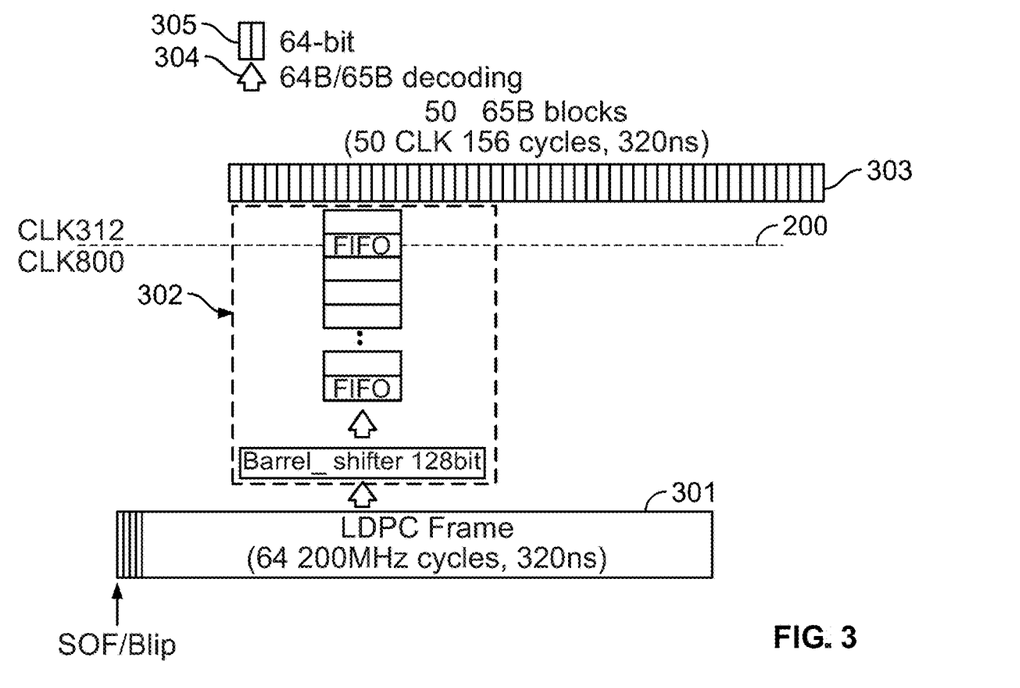
FIG. 3 illustrates how latency variation may be introduced during ingress, or reception, of a data frame across a clock domain boundary.

Similarly on the ingress, or receive, side, in receive path 122, as shown in FIG. 3, a 320 ns LDPC frame 301 occupying 64 unit intervals of a 200 MHz clock (the 800 MHZ clock divided by 4) is formed from the incoming datastream with the detection of SOF, which may be an Rx Blip. This LDPC frame is clocked in across boundary 200 via the FIFO buffer of a deframer/decoder 302 and reconstructed as 50 65-bit blocks 303 occupying 50 unit intervals of a 156 MHz clock (the 312.5 MHZ clock divided by 2), extending over a total duration of 320 ns. The 65-bit data is decoded (e.g., using 64B/65B decoding 304) into 64-bit data 305. As the data crosses boundary 200 via the FIFO buffer of deframer/decoder 302, it is clocked into the FIFO buffer of deframer/decoder 302 according to the 800 MHZ clock, but clocked out of the FIFO buffer of deframer/decoder 302 according to the 312.5 MHZ clock, whose edges have a varying relationship with the edges of the 800 MHz clock as noted above. As in the case of the egress path, the formation of the LDPC frame from the continuous incoming datastream, and the clock edge relationship of the two clocks is determined in deframer/decoder 302. As a result, unless corrected in accordance with implementations of the subject matter of this disclosure, different blocks of data would leave the FIFO buffer of deframer/decoder 302 after different durations spent within the FIFO buffer of deframer/decoder 302, depending on the relative positions of the edges of the two clocks, causing latency variations and giving rise to disruptions in the data.

In accordance with implementations of the subject matter of this disclosure, latency variations may be accounted for each time a link is trained—e.g., on power-up or after a hardware reset—by treating contributions to latency variation in the transmit (egress) direction differently from contributions to latency variation in the receive (ingress) direction.

In the transmit (egress) direction, both the 312.5 MHz clock and the 800 MHz clock are local to the transmitting PHY. Therefore, with a master clock of 3.2 GHz, if both clocks are reset at the same time, their edges will be aligned and will always realign after about 320 ns (100 unit intervals of the 312.5 MHz clock and 256 unit intervals of the 800 MHz clock). Therefore, contributions to latency variation can be minimized at the transmit end by resetting both clocks at the same time, although irregularities in the 312.5 MHz clock may result, in some implementations, in a contribution from the transmit end of up to 0.3125 ns of latency variation. Nevertheless, even if there is latency, the amount of latency will be known, without variation.

The receive (ingress) direction is more complicated. The receiver PMA module is in the same clock domain as the remote transmitter PMA module—viz., the clock domain of the channel—so the two PMA clocks are aligned within one unit interval (i.e., within 1.25 ns at 800 MHz). However, the 312.5 MHz clock at the remote transmitter PCS module is across two clock domain boundaries from the 312.5 MHz clock of the receiver PCS module, which may give rise to about 6.4 ns of latency. Specifically, for a PCS implementation with a 2× datapath, the resulting latency variation could be as much as one unit interval of the aforementioned 156.25 MHz clock (the 312.5 MHz clock divided by 2)—i.e., about 6.4 ns—for each boundary crossing, for a total possible latency variation of 12.8 ns.

In a first implementation in the transmit direction, by always releasing the reset or restarting the framer/encoder 204 at a constant fixed phase relationship point of the 312.5 MHz PCS clock and the 800 MHz PMA clock (or the sync_pulse), and because the LDPC frame always starts on the first cycle of the 800 MHz PMA clock after the clock is started, a constant fixed latency is established on the time domain boundary crossing of the first data of 50 65 B blocks to the SOF of an LDPC frame. In the receive direction, detection of the start of a received LDPC frame is used as a trigger to reset the 312.5 MHz PCS clock while keeping the 800 MHz PMA clock running. The LDPC frame synchronization signal, or "start-of-frame (SOF)" or "blip signal," may be recovered—e.g., during link training—from the received signal—e.g., by protocol logic circuitry 141 in PCS 101. The latency contribution determined as a result of this alignment of the two clocks to the blip signal remains fixed. On a subsequent reset event or power-down/power-up cycle, this reset operation can be repeated to allow the latency contribution to be determined and fixed, elimination latency variation.

In a second implementation in the receive direction, a latency value is determined—by measurement or by simulation—for each unit interval of the 800 MHz PMA clock. That is, for each blip signal detected, the latency from the most recent alignment of the 312.5 MHz PCS clock and the 800 MHz PMA clock is measured (by measuring the number of 800 MHz PMA clock intervals between the "Rx blip" and the sync pulse). That determination is made on the initial blip signal detection. A latency value is determined for each unit interval of the 800 MHz PMA clock for the duration of an LDPC frame—i.e., 256 unit intervals. The 256 latency values are stored—e.g., in a look-up table—and during run-time, on detection of a blip signal, the current unit interval out of the 256 possibilities is identified and the corresponding latency value is retrieved from the look-up table, thereby eliminating variation in the latency by providing this latency variation information to the timestamping logic to adjust the timestamp value accordingly.

Figure 4:
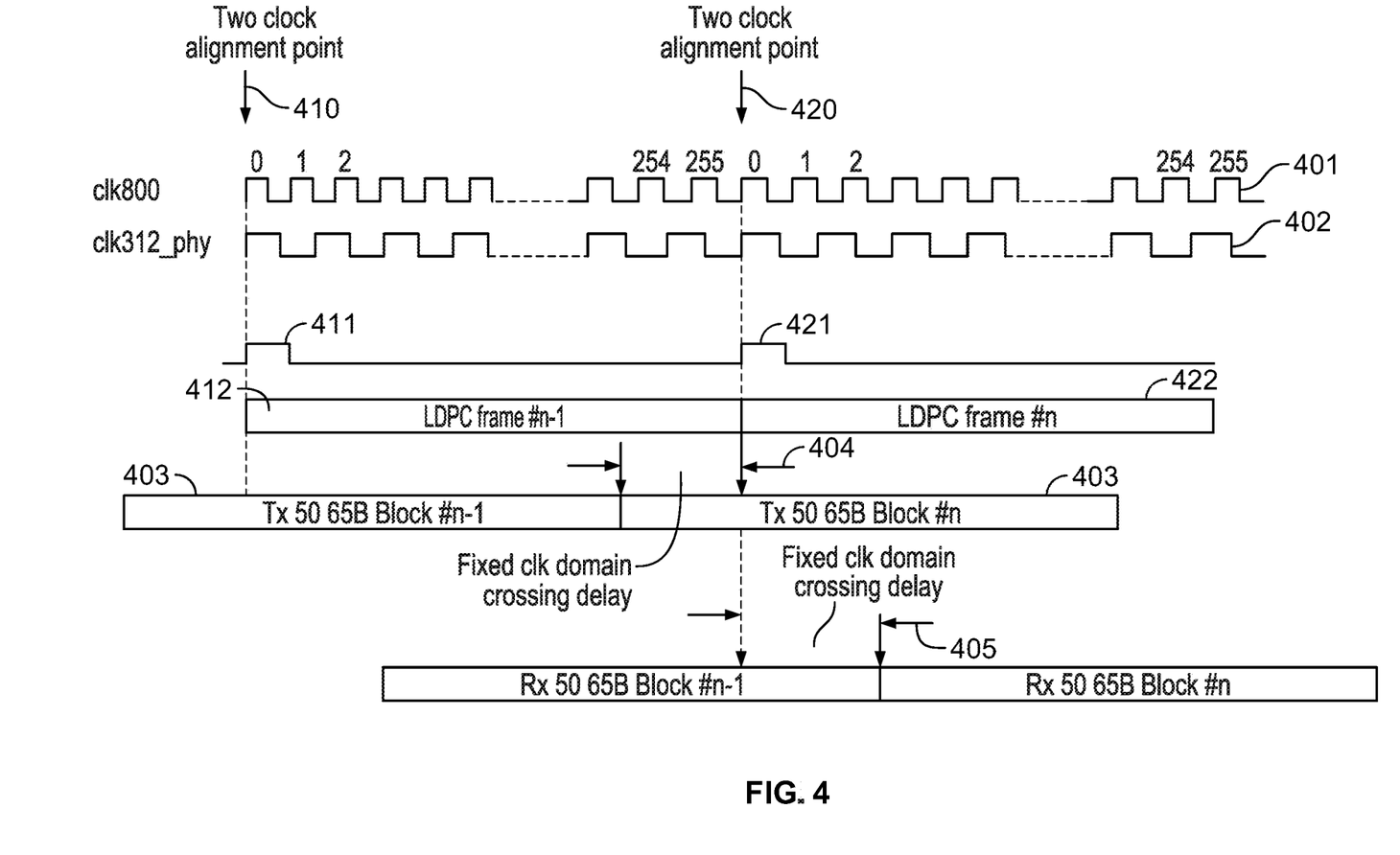
FIG. 4 is a timing diagram illustrating a first implementation in accordance with the subject matter of this disclosure.

FIG. 4 is a timing diagram illustrating the combined first implementation in the transmit and receive directions. 800 MHz PMA clock 401 is aligned to 312.5 MHz PCS clock 402 at 410 and 420, which are aligned with respective LDPC frame blip signals 411, 421, respectively, which are based on received LDPC frames 412, 422, respectively. On the transmit side, the 50 blocks of 65 B-encoded data 403 in the PCS clock domain are transmitted into the FIFO buffer of framer/encoder 204 at a time that is ahead of each clock alignment point by the measured fixed clock domain crossing delay (i.e., latency) so that, after the determined crossing delay 404, the resulting transmitted LDPC frame 422 begins at the clock alignment point 420. On the receive side, each received LDPC frame begins, by definition, at blip signal 411, 421 and propagates, beginning at that time, through the FIFO buffer of deframer/decoder 302 from the PMA clock domain to the PCS clock domain, so that each resulting group of 50 received blocks of 65 B-encoded data begins at a time delayed from the respective clock alignment point 420 by the determined crossing delay 405.

Figure 5:
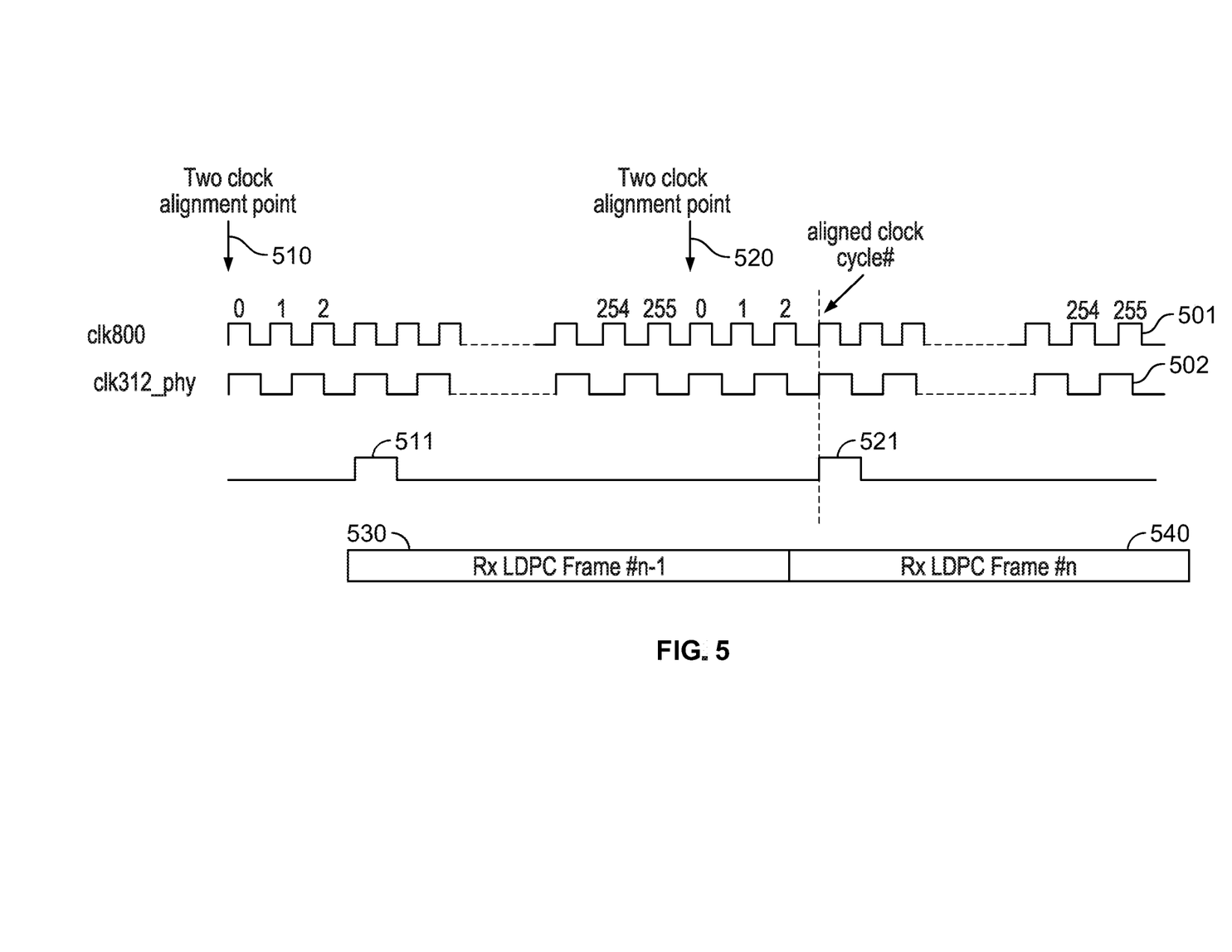
FIG. 5 is a timing diagram illustrating a second implementation in accordance with the subject matter of this disclosure.

FIG. 5 is a timing diagram illustrating the second implementation in the receive direction. 800 MHz PMA clock 501 is aligned to 312.5 MHz PCS clock 502 at 510 and 520, based on power-up of PHY 100. This fixes the value of an egress latency (not shown) that is similar to egress latency 404 of FIG. 4. The transmit-side value is determined similarly to the first implementation (discussed above). On the receive side, LDPC frames 530 and 540 are received and corresponding respective LDPC frame blip signals 511, 521 are recovered based on received LDPC frames 530, 540, respectively. When blip signals 511, 521 are recovered, a corresponding cycle (n=0, . . . , 255) out of the 256 cycles of 800 MHz PMA clock 501 (in this case, it is the fourth cycle n=3) is identified. (One way to compute the value n is to count the number of clock intervals between blip signals of 511, 521 and the sync_pulse as described above.) The nth delay value is retrieved from the look-up table described above which was previously populated by simulation or measurement, and the retrieved value is used as the receive latency adjustment in the timestamp logic until the next reset. The transmit and receive latency values are determined only once, during training, and are used until the next reset, and therefore there is no latency variation.

Once the latency values in each direction have been determined, and are known to have little or no variation, they can be taken into account (e.g. by control circuitry 143) when transporting data across a clock domain boundary. If the latency is known, then misalignment of data, based on misalignment of the clocks on either side of the boundary, which might lead to jitter or other artifacts, can be corrected (e.g., by adjusting timestamps on the data packets).

The implementations above are described in connection with a 10 Gbps link speed. However, other implementations are possible at other link speeds, and the various clock speed values and latency values scale linearly. Thus, for a 5 Gbps link, the PMA clock speed in 400 MHz and the PCS clock speed is 156.25 MHz, and the unit interval and latency durations scale accordingly. That is, the frame duration will be 640 ns, because the amount of data is the same but all the clocks are running at half the speed, which also means that the amount of latency, and any latency variation, is doubled.

Figure 6:
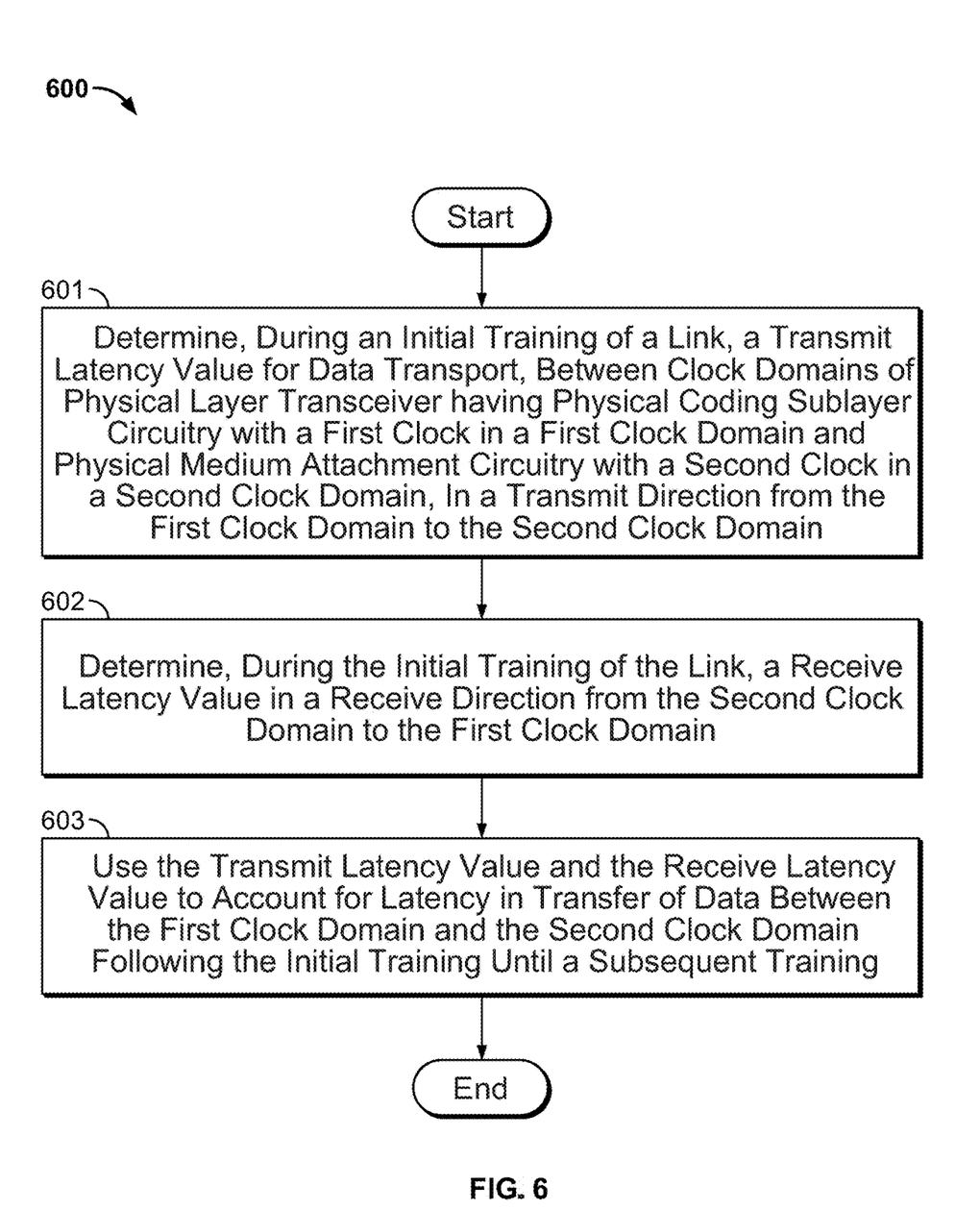
FIG. 6 is a flow diagram illustrating a method in accordance with implementations of the subject matter of this disclosure.

A method 600 according to implementations of the subject matter of this disclosure is diagrammed in FIG. 6. Method 600 begins at 601 where, during an initial training of a link, a transmit latency value is determined for data transport, between clock domains of physical layer transceiver having physical coding sublayer circuitry with a first clock in a first clock domain and physical medium attachment circuitry with a second clock in a second clock domain, in a transmit direction from the first clock domain to the second clock domain.

At 602, during the initial training of the link, a receive latency value is determined in a receive direction from the second clock domain to the first clock domain.

At 603, the transmit latency value and the receive latency value are used to account for latency in the transfer of data between the first clock domain and the second clock domain (e.g., by adjusting timestamps of packets as they cross the clock domain boundary, to account for the determined receive latency value and/or transmit latency value) following the initial training until a subsequent training, when new transmit and receive latency values are determined. Method 600 then ends.

Thus it is seen that reduction of variation in packet latency in an Ethernet physical layer transceiver, by separately calibrating packet latency to known values in the transmit and receive directions, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of reducing impact of variation in latency in data transport between clock domains of a physical layer transceiver having physical coding sublayer circuitry with a first clock in a first clock domain and physical medium attachment circuitry with a second clock in a second clock domain, the method comprising:

determining, during an initial training of a link, a transmit latency value in a transmit direction from the first clock domain to the second clock domain;

determining, during the initial training of the link, separately from determining the transmit latency value, a receive latency value in a receive direction from the second clock domain to the first clock domain; and using the transmit latency value and the receive latency value to account for latency in transfer of data between the first clock domain and the second clock domain following the initial training until a subsequent training.

2. The method of claim 1 wherein determining the transmit latency value in the transmit direction comprises resetting the first clock and the second clock simultaneously and starting transfer of data from the first clock domain to the second clock domain at a predetermined cycle of one of the first clock and the second clock.

3. The method of claim 2 wherein starting the transfer of data from the first clock domain to the second clock domain at the predetermined cycle of one of the first clock and the second clock comprises starting the transfer of data from the first clock domain to the second clock domain at the predetermined cycle of the second clock.

4. The method of claim 1 wherein determining the receive latency value in the receive direction comprises resetting the first clock simultaneously with detection of a received data frame.

5. The method of claim 4 wherein the detection of the received data frame comprises recovery of a start-of-frame signal.

6. The method of claim 1 wherein determining the receive latency value in the receive direction comprises:
   detecting a start of a received data frame;
   identifying a number of unit intervals of the first clock that have elapsed, from a most recent simultaneous reset of the first clock and the second clock, to the start of the received data frame; and
   retrieving, as the receive latency value, a stored latency value corresponding to the number of unit intervals.

7. The method of claim 6 wherein the retrieving comprises retrieving the receive latency value from a look-up table, using the number as an index.

8. The method of claim 7 further comprising, prior to the detecting, establishing the look-up table in a calibration operation.

9. The method of claim 8 wherein the calibration operation comprises separately measuring the receive latency value when a data frame is received in each of a plurality of unit intervals of the first clock.

10. The method of claim 8 wherein the calibration operation comprises simulating reception of a data frame in each of a plurality of unit intervals of the first clock, and simulating measurement of the receive latency value for each of the plurality of unit intervals.

11. The method of claim 1 wherein determining the transmit latency value in the transmit direction comprises:
   establishing a synchronization pulse where the first clock and the second clock align; and
   aligning a transmit frame boundary with the synchronization pulse to fix the transmit latency value.

12. The method of claim 1 wherein determining the receive latency value in the receive direction comprises:
   establishing a synchronization pulse where the first clock and the second clock align; and
   counting, as the receive latency value, a number of time intervals from the synchronization pulse to a received frame boundary.

13. The method of claim 1 wherein using the transmit latency value and the receive latency value to account for latency in transfer of data between the first clock domain and the second clock domain comprises adjusting timestamps of data packets transferred between the first clock domain and the second clock domain.

14. A physical layer transceiver comprising:
   physical coding sublayer circuitry and physical medium attachment circuitry, the physical coding sublayer circuitry being configured for transport of data between a host device and the physical medium attachment circuitry, and the physical medium attachment circuitry being configured for transport of data between the physical coding sublayer circuitry and a channel medium; and
   clock and control circuitry configured to provide a clock standard to the physical coding sublayer circuitry and the physical medium attachment circuitry, the clock standard being converted to a first clock for a first clock domain of the physical coding sublayer circuitry and a second clock for a second clock domain of the physical medium attachment circuitry, the clock and control circuitry further being configured to reduce impact of variation in latency in data transport between the first clock domain and the second clock domain by:
   determining, during an initial training of a link, a transmit latency value in a transmit direction from the first clock domain to the second clock domain;
   determining, during the initial training of the link, a receive latency value in a receive direction from the second clock domain to the first clock domain; and
   using the transmit latency value and the receive latency value to account for latency in transfer of data between the first clock domain and the second clock domain following the initial training until a subsequent training.

15. The physical layer transceiver of claim 14 wherein the clock and control circuitry is configured to determine the transmit latency value in the transmit direction by resetting the first clock and the second clock simultaneously, and to start transfer of data from the first clock domain to the second clock domain at a predetermined cycle of one of the first clock and the second clock.

16. The physical layer transceiver of claim 15 wherein the clock and control circuitry is configured to start the transfer of data from the first clock domain to the second clock domain at the predetermined cycle of one of the first clock and the second clock by starting the transfer of data from the first clock domain to the second clock domain at the predetermined cycle of the second clock.

17. The physical layer transceiver of claim 14 wherein the clock and control circuitry is configured to determine the receive latency value in the receive direction by resetting the first clock simultaneously with detection of a received data frame.

18. The physical layer transceiver of claim 17 wherein the clock and control circuitry further comprises clock-data recovery circuitry configured to recover a start-of-frame signal upon detection of the received data frame.

19. The physical layer transceiver of claim 14 wherein the clock and control circuitry is configured to determine the receive latency value in the receive direction by:
   detecting a start of a received data frame;
   identifying a number of unit intervals of the first clock that have elapsed, from a most recent simultaneous reset of the first clock and the second clock, to the start of the received data frame; and
   retrieving, as the receive latency value, a stored latency value corresponding to the number of unit intervals.

20. The physical layer transceiver of claim 19 wherein the clock and control circuitry is configured to retrieve the receive latency value from a look-up table, using the number as an index.

21. The physical layer transceiver of claim 20 wherein the clock and control circuitry is configured to establish the look-up table in a calibration operation.

22. The physical layer transceiver of claim 21 wherein the clock and control circuitry is configured to establish the look-up table by:
- measuring the receive latency value when a data frame is received in each of a plurality of unit intervals of the first clock; and
- storing, in the look-up table, the measured receive latency value for each of the plurality of unit intervals.

23. The physical layer transceiver of claim 21 wherein the clock and control circuitry is configured to establish the look-up table by:
- simulating reception of a data frame in each of a plurality of unit intervals of the first clock;
- simulating measurement of the receive latency value for each of the plurality of unit intervals; and
- storing, in the look-up table, the simulated measured receive latency value for each of the plurality of unit intervals.

24. The physical layer transceiver of claim 14 wherein the clock and control circuitry is configured to determine the transmit latency value in the transmit direction by:
- establishing a synchronization pulse where the first clock and the second clock align; and
- aligning a transmit frame boundary with the synchronization pulse to fix the transmit latency value.

25. The physical layer transceiver of claim 14 wherein the clock and control circuitry is configured to determine the receive latency value in the receive direction by:
- establishing a synchronization pulse where the first clock and the second clock align; and
- counting, as the receive latency value, a number of time intervals from the synchronization pulse to a received frame boundary.

26. The physical layer transceiver of claim 14 wherein the clock and control circuitry is configured to account for latency in transfer of data between the first clock domain and the second clock domain, to reduce impact of variation in latency in data transport between the first clock domain and the second clock domain, by using the transmit latency value and the receive latency value to adjust timestamps of data packets transferred between the first clock domain and the second clock domain following the initial training until the subsequent training.

* * * * *